United States Patent [19]
Akano
[11] Patent Number: 4,623,871
[45] Date of Patent: Nov. 18, 1986

[54] RECEIVING APPARATUS

[75] Inventor: Shinichi Akano, Shibuya, Japan
[73] Assignee: Yamatake Honeywell, Tokyo, Japan

[21] Appl. No.: 736,920
[22] Filed: May 22, 1985

[30] Foreign Application Priority Data

Jun. 4, 1984 [JP] Japan ................................ 59-113009
Sep. 12, 1984 [JP] Japan ................................ 59-189707

[51] Int. Cl.[4] ................................................ H04M 1/16
[52] U.S. Cl. ............................ 340/310 A; 340/870.39
[58] Field of Search .......... 340/310 A, 310 R, 870.39; 179/81 R, 16 F

[56] References Cited

U.S. PATENT DOCUMENTS 4,400,588 8/1983 Stobbs et al. ..................... 179/81 R

*Primary Examiner*—John W. Caldwell, Sr.
*Assistant Examiner*—David A. Okonsky
*Attorney, Agent, or Firm*—Trevor B. Joike

[57] ABSTRACT

A receiving apparatus for receiving an electrical signal over a 2-wire transmission line, the electrical signal having a signal component and a bias component, the bias component being used by the receiving apparatus for providing power to the receiving apparatus, the receiving apparatus having a first variable impedance element and a receiving impedance element connected in series across the transmission line, a second variable impedance element and a series impedance element connected in series across the transmission line, and a control circuit for controlling the first variable impedance element to stabilize the voltage across the transmission line to a constant value and for controlling the second variable impedance element to stabilize the current flowing through the series impedance element to a constant value, so that a current flowing through the receiving impedance element relates to the signal component and the current flowing through the series impedance element relates to the bias component.

20 Claims, 7 Drawing Figures

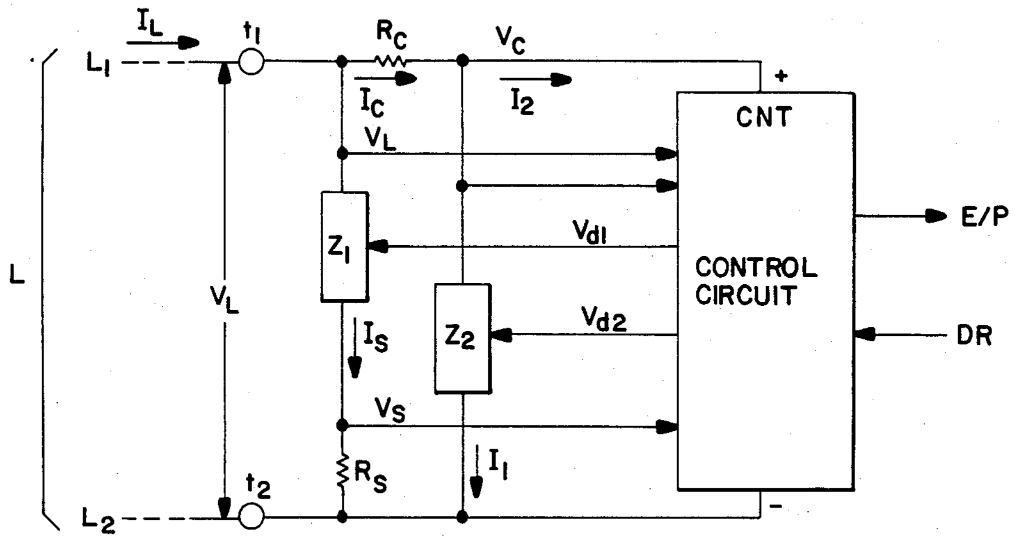
$Z_1$, $Z_2$: VARIABLE IMPEDANCE ELEMENT
$R_S$, $R_C$: RESISTOR (IMPEDANCE ELEMENT)
CNT : CONTROL CIRCUIT (LOAD CIRCUIT)
*Fig. 3*
*Fig. 4*
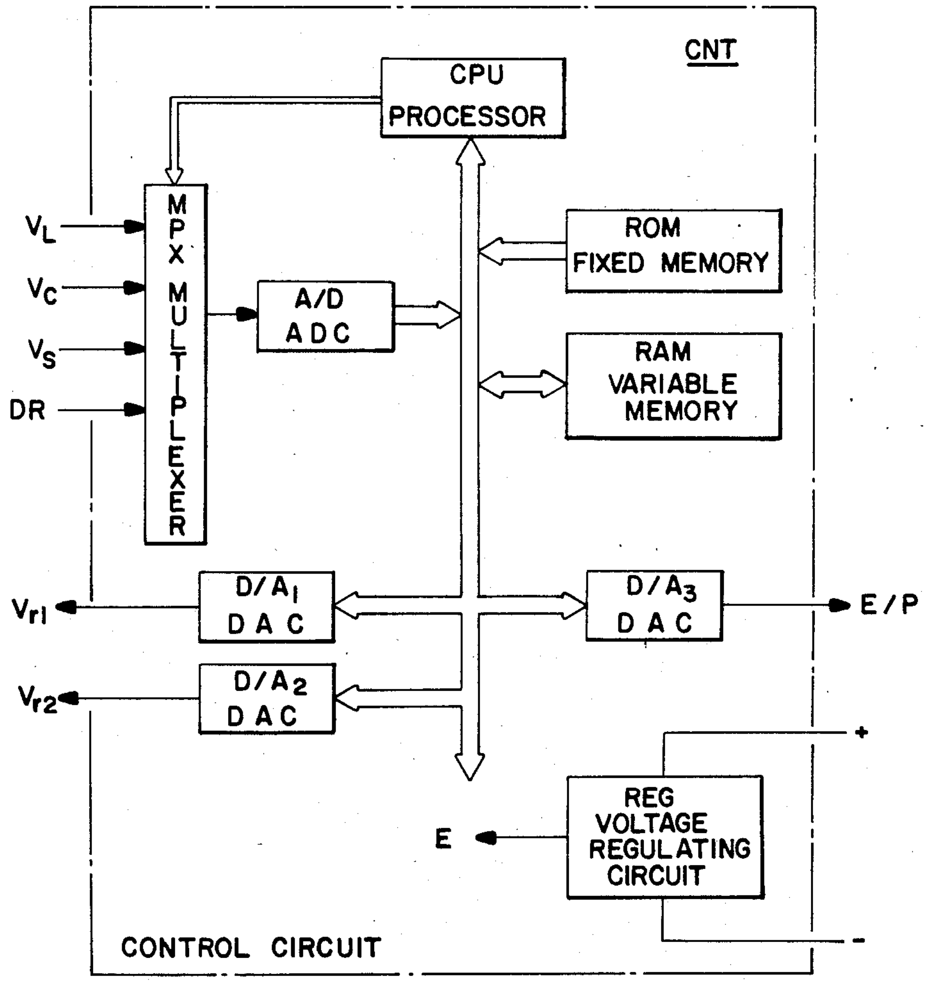

RECEIVING APPARATUS

BACKGROUND OF THE INVENTION

The present invention relates to a receiving apparatus which receives, in an industrial process for example, a signal in the form of a current value and controls a control object device such as a valve.

In a typical industrial process, a receiving apparatus called a positioner is generally provided for remotely controlling valves, etc. In such a case, a signal in the form of a current value which changes in the range, for example, of 4–20 mA is transmitted from the central control unit. This signal is received by the receiving apparatus and controls devices in accordance with a current value.

However, the apparatus of the prior art has the disadvantage that a 2-wire system transmission line is required for transmission of a current value forming the signal and simultaneously another two wire system transmission line is required in order to supply the required power to the receiving apparatus. Namely, a 4-wire system transmission line is essential which increases the amount of wire material required for the transmission line and the man-hour effort required for wiring the system, and the facility cost also becomes high.

The prior art also has the disadvantage that an additional transmitting apparatus is required which must be connected with the control unit by an exclusive transmission line in order to monitor the control and operating conditions of valves, etc., and thereby an uneconomical investment is required.

SUMMARY OF THE INVENTION

The present invention has an object to essentially solve the disadvantages of the prior art. Moreover, in one form of the invention, a receiving appartus receives, as an example, a 4–20 mA signal including a signal component having a value in the range from 0 to 16 mA and a bias component of 4 mA, the receiving apparatus having a first variable impedance element and a receiving impedance element arranged in series with the 2-wire system transmission line wherein the impedance of the first variable impedance element is controlled in such a direction as to stabilize the in-line voltage from the transmission line, a series circuit including a series impedance element and a second variable impedance element connected in parallel to such first variable and receiving impedance elements wherein the current to the series impedance element is controlled in such a direction as to keep it to a constant value in accordance with the bias component, and a load circuit connected in parallel to the second variable impedance element. The bias component is used as the power supply and the signal component is changed in accordance with a sending signal while the current to the series impedance is kept constant so that transmission is carried out. Thus, power is supplied only by the 2-wire system transmission line and simultaneously the transmitting/receiving function is also provided. Separate control apparatus perform the various controlling functions.

In another form of the invention, a first variable impedance element and a receiving impedance element are arranged in series to the 2-wire system transmission line, the impedance of the first variable impedance element being controlled in such a direction as to stabilize the in-line voltage of the transmission line, a series impedance element and a second variable impedance element are arranged in series and are connected in parallel to series arrangement of the first variable impedance element and the receiving impedance element, the current flowing into the series impedance element being controlled in such a direction as to keep it constant in accordance with a bias component wherein a single control apparatus performs the various controls and wherein a load circuit is connected in parallel to the second variable impedance element.

Only a current indicating a signal value flows into the receiving impedance element, thereby a signal can be received and a power supply current can be applied freely within the range of the bias component.

BRIEF DESCRIPTION OF THE DRAWINGS

The present invention is explained in detail with reference to the drawings indicating the embodiments thereof in which:

FIG. 3 shows another form of the invention;

FIG. 4 shows a block diagram of a control circuit of FIG. 3;

DETAILED DESCRIPTION

Figure 1:
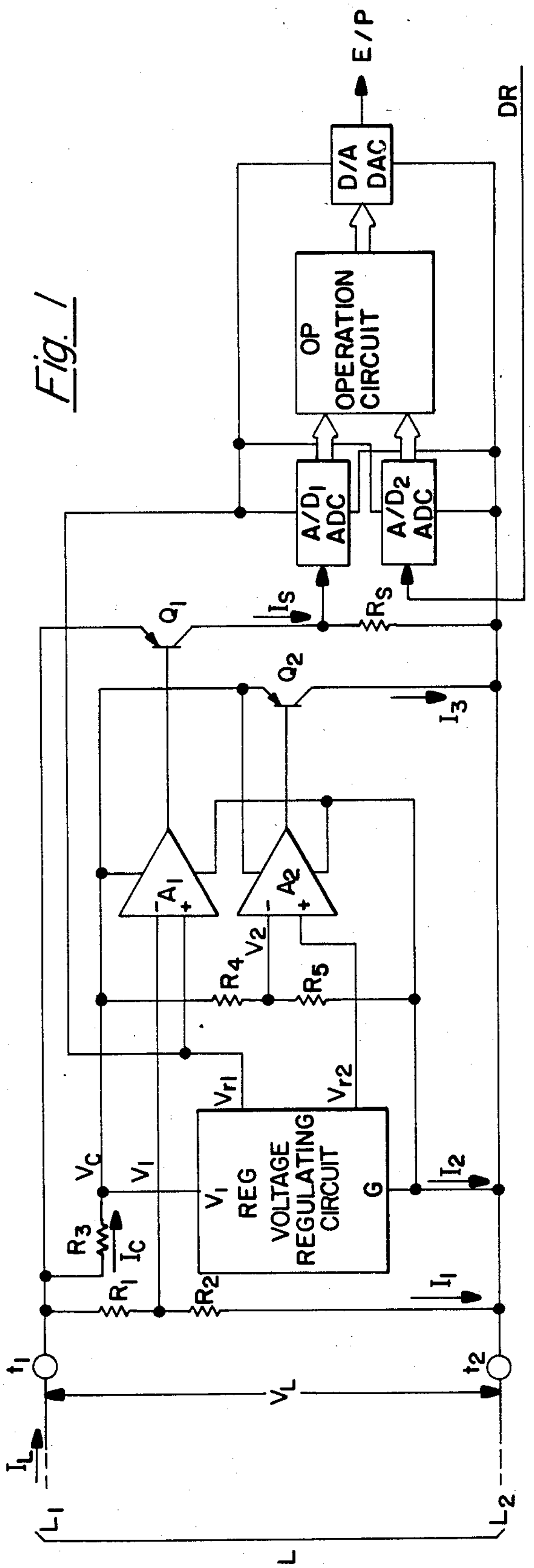
FIG. 1 is a schematic diagram of the invention.

FIG. 1 is a schematic diagram, wherein the 2-wire system transmission line L connected through the line terminals $t_1$, $t_2$ is composed of the lines $L_1$and $L_2$. As a first variable impedance element, a transistor $Q_1$ has an emitter connected to terminal $t_1$and a collector connected to one side of a receiving impedance element in the form of resistor $R_s$the other side of which is connected to terminal $t_2$. A voltage dividing circuit consisting of resistors $R_1$and $R_2$ is connected essentially in parallel to resistor $R_s$ and to series resistor $R_3$ which resistor acts as a series impedance element connected on one side to terminal $t_1$ and on the other to the emitter of transistor $Q_2$ the collector of which is connected to terminal $t_2$. Transistor $Q_2$ acts as a second variable impedance element.

Moreover, an integrated circuit acting as a regulated power supply circuit REG and a voltage dividing circuit of series connected resistors $R_4$ and $R_5$ are connected parallel to transistor $Q_2$. Differential amplifiers $A_1$ and $A_2$ are connected as a load circuit and moreover the analog/digital converters (hereinafter referred to as ADC) $A/D_1$ and $A/D_2$, an operation circuit OP consisting of a microprocessor and memory, etc., and a digital/analog converter (hereinafter referred to as DAC) D/A are also connected as load circuits to the power supply regulating circuit REG.

Here, the resistors $R_1$, $R_2$ and differential amplifier $A_1$ form the first control circuit and controls the impedance of transistor $Q_1$ in a direction to stabilize in-line voltage $V_L$ in accordance with voltage $V_L$ of transmission line L. Amplifier $A_1$ is provided with the reference voltage $V_{r1}$ from power supply regulating circuit REG. Thereby, an in-line voltage $V_L$ is kept at a constant value, for example, of 10V, without relation to a value of line current $I_L$.

The resistors $R_4$, $R_5$ and differential amplifier $A_2$ form the second control circuit and controls the impedance of transistor $Q_2$ in a direction as to stabilize a value of current $I_c$ applied to the resistor $R_3$ in accordance with a voltage $V_2$ obtained by dividing a load circuit voltage $V_c$ of resistor $R_3$ with the resistors $R_4$, $R_5$. Amplifier $A_2$ is provided with the reference voltage $V_{r2}$ from power supply regulating circuit REG. Thereby, a current $I_c$ is kept at a constant value, for example, of 4 mA without relation to a power supply current of each load circuit.

Accordingly, since current $I_1=V_L/(R_1+R_2)$, which current flow through resistors $R_1$, $R_2$ becomes constant, the current $I_s$ flowing through resistor $R_s$ becomes $I_s=I_L-(I_c+I_1)$. Moreover, by determining $(I_c+I_1)$ equal to the bias component, $I_s$ is accordingly composed, for example, of only the signal component of 0–16 mA. The voltage across resistor $R_s$ is converted to a digital signal by ADC A/$D_1$. With such voltage supplied to the operation circuit OP as the setting value, an actual measured value sent from the driver DR described later is given to the operation circuit OP after it is converted in the same way by ADC A/$D_2$. Thereby, the operation circuit OP transmits a control signal through calculation for control. This control signal is converted to an analog signal by DAC D/A and is then applied to the electric pneumatic converter E/P in order to control opening of valves. Thereby, opening of the valve can be set under the condition that the setting value matches an actual measured value.

In FIG. 1, since a negative feedback is provided for differential amplifiers $A_1$, $A_2$ and since therefore $V_1=V_{r1}$ and $V_2=V_{r2}$, the following relation can be obtained:

$$V_1=V_L[R_2/(R_1+R_2)]=V_{r1}$$

$$V_L=V_{r1}[1+(R_1/R_2)] \quad (1)$$

$$V_2=V_C[R_5/(R_4+R_5)]=V_{r2}$$

$$V_C=V_{r2}[1+(R_4/R_5)] \quad (2)$$

Here, since $V_{r1}$, $V_{r2}$ are stabilized, $V_L$ and $V_C$ also become constant and the following relation can be obtained:

$$I_C=(V_L-V_C)/R_3 \quad (3)$$

Namely, $(I_C+I_1)$ is constant. Meanwhile, a line current $I_L$ can be expressed by the following equation:

$$I_L=I_1+I_2+I_3+I_s=I_1+I_C+I_s \quad (4)$$

Here, since $I_1$, $I_C$ are constant, $$I_s=I_L-(I_C+I_1) \quad (5)$$

Therefore, when $I_L$ is for example 4–20 mA, $I_s$ is 0–16 mA by setting $(I_C+I_1)$ to 4 mA. Namely, any influence is not given to reception of signal indicated by $I_s$ and a power supply current to a maximum of 4 mA can be supplied stably to the load circuit.

By a control unit (not shown), a line current $I_L$ is transmitted by a constant current circuit and any influence is not given to a current value even when an input impedance in the receiving side changes.

Figure 2:
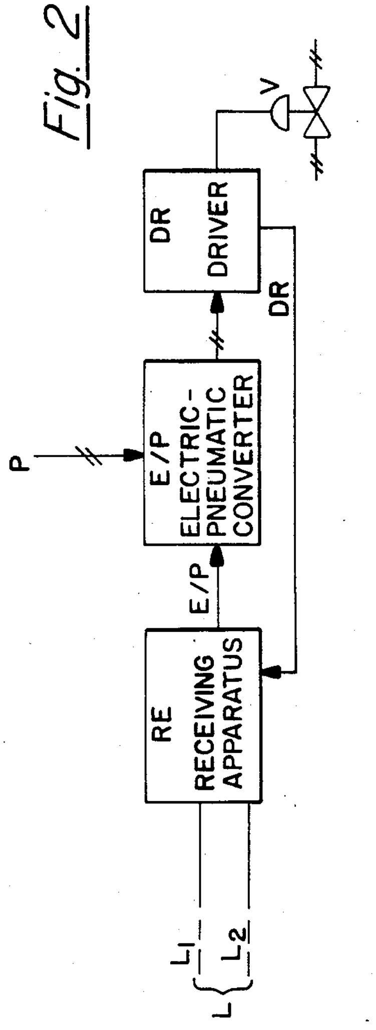
FIG. 2 is a block diagram showing a control arrangement using the receiving apparatus of FIG. 1.

FIG. 2 is a block diagram indicating an example of how the receiving apparatus RE shown in FIG. 1 is used in a communication apparatus of the present invention. A receiving output of the receiving apparatus RE shown in FIG. 1 is supplied to the electric-pneumatic converter E/P. A pneumatic pressure P becomes a pressure in accordance with a receiving output and is sent to a driver DR such as an air cylinder, which drives a valve V for controlling the opening thereof. Simultaneously, the opening is detected as an actual measured value by a potentiometer connected to the drive shaft and it is then sent to the receiving apparatus RE.

Therefore, power can be supplied simultaneously from only the 2-wire system transmission line, so that the amount of wire material and wiring steps can be reduced remarkably and the facility cost can also be reduced.

Here, in FIG. 1, the transistors $Q_1$, $Q_2$ may be replaced with controllable other variable impedance elements such as field effect transistors or photocouplers. The same effect can also be obtained by a circuit arrangement in which an input signal is not converted to a voltage by a resistor $R_s$ and a current value is rather directly read, or the resistor $R_3$ is replaced with a variable impedance element such as a constant current diode. Moreover, it is possible to generate the reference voltages $V_{r1}$, $V_{r2}$ with a constant voltage diode in place of the power supply regulating circuit REG and connect all load circuits in parallel to the transistor $Q_2$.

For the line current, it is enough to determine a bias component in accordance with the required power supply current of the load circuit and a motor, etc. can also be used as the load circuit.

In FIG. 2, a motor can also be used as a driver and the same effect can also be obtained by using a dumper and pump, etc. as the control object device in addition to a valve V. Namely, the present invention can be modified freely in various kinds of field devices which operate with an input signal representing a change in the value of line current.

According to the present invention, as is apparent from the above explanation, the power required by the receiving side is supplied simultaneously only by the 2-wire system transmission line. Therefore, a separate power supply path is unnecessary and thereby the facility cost of the line can be reduced remarkably and outstanding advantages can be obtained in the various kinds of receiving apparatus which receive the signals indicated by current values.

FIG. 3 is a block diagram indicating another form of the present invention. The 2-wire system transmission line L connected through the line terminals $t_1$, $t_2$ is composed of the lines $L_1$, $L_2$. Moreover, a first variable impedance element $Z_1$ and a receiving resistor $R_s$ are connected in series across terminals $t_1$ and $t_2$, receiving resistor $R_s$ acting as a receiving impedance element. Meanwhile, a series circuit of a series impedance element in the form of resistor $R_C$ and a second variable impedance element $Z_2$ are connected in parallel to $Z_1$ and $R_s$.

Moreover, a control circuit CNT is connected in parallel to the element $Z_2$ as the power supply load. The same circuit CNT is given an in-line voltage $V_L$ with reference to the side of line terminal $t_2$, a load side voltage $V_C$ of resistor $R_C$, a terminal voltage $V_s$ of resistor $R_s$, and an actually measured value sent from a driver DR such as the signal DR shown in FIG. 2. The control circuit CNT sends the first and second control voltages $V_{d1}$, $V_{d2}$ in accordance with the voltages $V_L$, $V_C$. The impedances of elements $Z_1$ and $Z_2$ are controlled and thereby a voltage $V_L$ is kept to a constant value, for example 10V, while a voltage $V_C$ is kept to a constant value, for example 7V. Simultaneously, in response to a received value the control calculation is carried out based on the voltage $V_s$ and an actual measured value sent from the driver DR, and thereby a control signal E/P is sent to the electric-pneumatic converter E/P.

Here, a current $I_C$ flowing through resistor $R_C$ is expressed by the following equation:

$$I_C=(V_L-V_C)/R_C \quad (6)$$

Therefore, the current $I_C$ becomes constant without relation to a load current $I_2$ by controlling the impedance of element $Z_1$ in such a direction as to stabilize $V_L$, by controlling the impedance of element $Z_2$ in such a direction as to stabilize $V_C$, and by adjusting a current $I_1$ applied thereto. Thus, the following equation can be obtained:

$$I_L=I_s+I_1+I_2=I_s+I_C$$

$$I_s=I_L-I_C \quad (7)$$

Namely, when $I_C$ is determined equal to the bias component, the current $I_s$ applied to the resistor $R_s$ is composed of only the signal component of 0–16 mA in the case where the line current $I_L$ is, for example, 4–20 mA and, therfore, a received value can be detected by the voltage $V_s$.

Moreover, when $I_L$ is 4–20 mA, a maximum power supply current of 4 mA can be applied freely.

By a control unit (not shown), a constant current circuit sends a line current $I_L$ and any influence is not applied on a current value even when an input impedance in the receiving side changes.

Moreover, if any changes of voltage $V_C$ affects operation of the load circuit, it is only necessary to insert a voltage stabilizing circuit to the part where the current $I_2$ flows.

Elements $Z_1$, $Z_2$ should be controllable and have a variable impedance. Transistors or photocouplers may be used.

FIG. 4 is a block diagram of control circuit CNT wherein a fixed memory ROM, a variable memory RAM, an analog digital converter (ADC) A/D, and digital analog converters (DAC) $D/A_1$–$D/A_3$ are interconnected with a processor CPU, such as a microprocessor, by a bus. The processor CPU executes the instructions in the fixed memory ROM, and the control operation can be realized while storing the specified data in the variable memory RAM.

The voltage $V_C$ shown in FIG. 3 is stabilized in the voltage regulator REG and it is then supplied to each part as the local power supply E.

Meanwhile, a multiplexer MPX which is controlled by the processor CPU is provided at the input side of ADC A/D and thereby voltages $V_L$, $V_C$, $V_s$ and the actual measured value sent from the driver DR are then selected and individually converted to digital signals by ADC A/D and thereafter applied to the processor CPU, which in turn applies the control data to DAC $D/A_1$–$D/A_3$ in accordance with such digital signals. Accordingly, the control voltages $V_{d1}$, $V_{d2}$ and the control signal to the electric-pneumatic converter E/P are transmitted.

Figure 5:
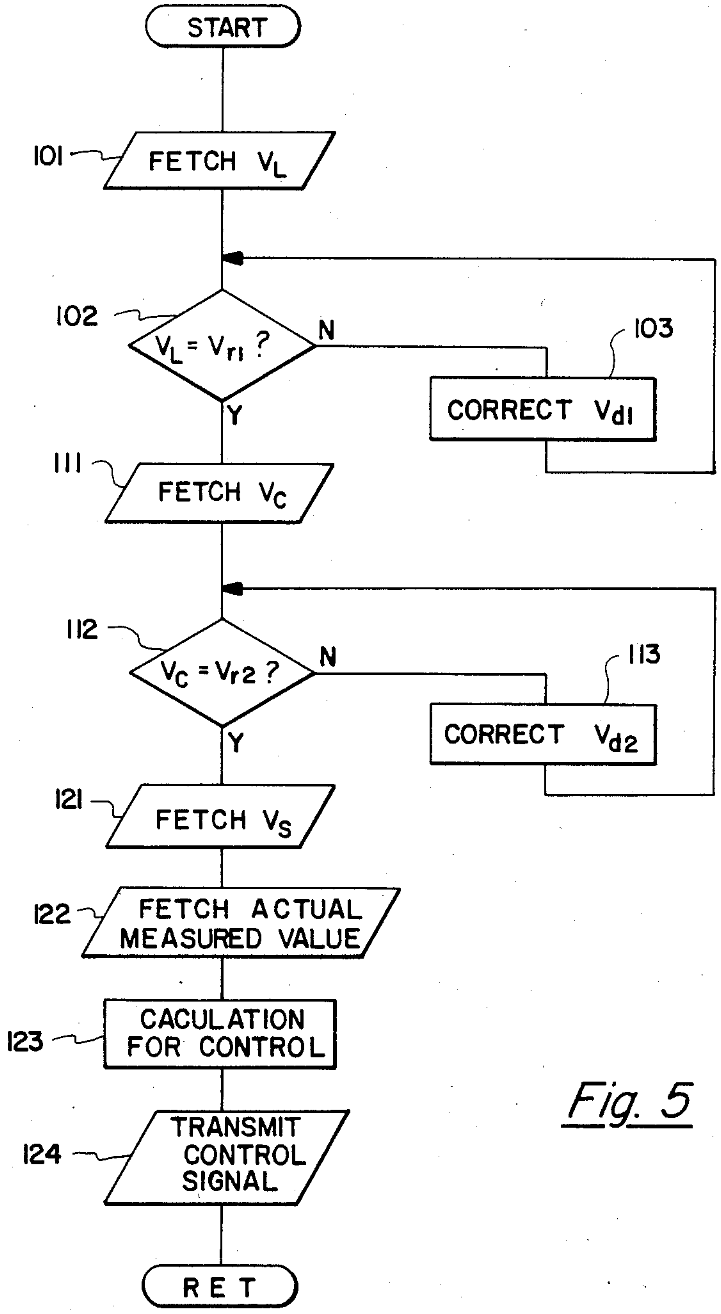
FIG. 5 shows a flow chart of control steps for the apparatus shown in FIG. 4; and, FIGS. 6 and 7 are block diagrams similar to that of FIG. 1 indicating other embodiments.

FIG. 5 shows a flow chart of control procedures by the processor CPU. Voltage $V_L$ is fetched at "101" through the multiplexer MPX and ADC A/D and then it is determined if $V_L=V_{r1}$ at "102" through comparison with the first reference voltage $V_{r1}$ which was stored previously in the fixed memory ROM. If $V_L$ and $V_{r1}$ are not equal, a correction control voltage $V_{d1}$ is supplied at "103" in accordance with a value of $V_L$, and such processes are repeated until the step 102 becomes Y (Yes).

Thereafter, voltage $V_C$ is fetched at "111" as in the case of step 101 and it is determined whether $V_C=V_{r2}$ at "112" through comparison with the second reference $V_{r2}$ as in the case of the step 102. If $V_C$ and $V_{r2}$ are not equal, a correction control voltage $V_{d2}$ is supplied at "113" until the answer becomes Y as in the case of step "103".

After $V_L$ and $V_C$ are kept constant by the above procedures, the voltage $V_s$ is fetched at "121" as in the case of step "101", the actual measured value is then fetched at "122" from the driver DR, the control calculations are conducted at "123" in accordance with such values, and the control signal is transmitted at "124" through the DAC $D/A_3$ and thereafter the step 101 and successive ones are repeated.

FIG. 2 is a block diagram indicating the overall communication apparatus. A receiving output from the communication apparatus RE shown in FIG. 3 is given to the electric-pneumatic converter E/P and herein a pneumatic pressure P becomes a pressure in accordance with a receiving output and is then sent to a driver DR such as an air cylinder. This cylinder drives a valve V and controls the opening ot it. Moreover, a current opening is detected as the actual measured value by a potentiometer coupled to the drive shaft and such value is sent to the communication apparatus RE.

Figure 6:
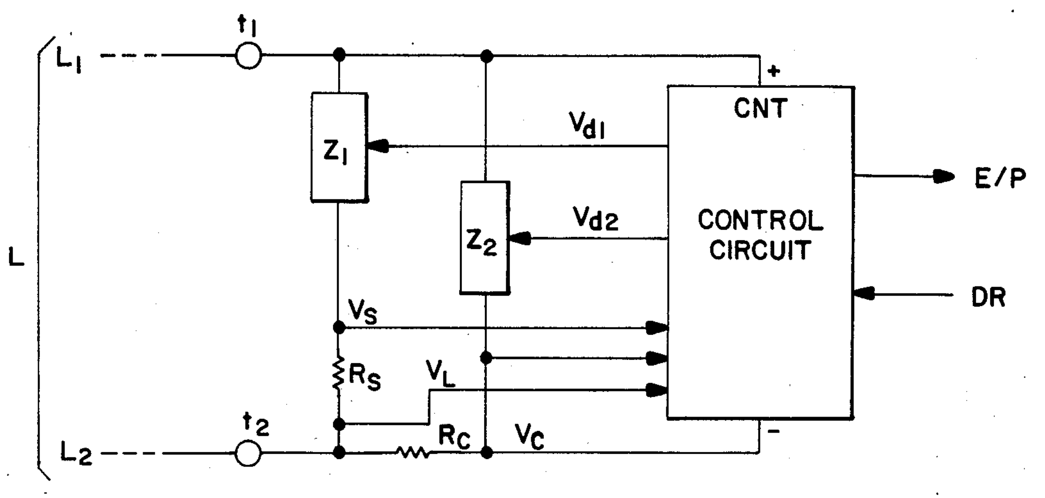
Figure 7:
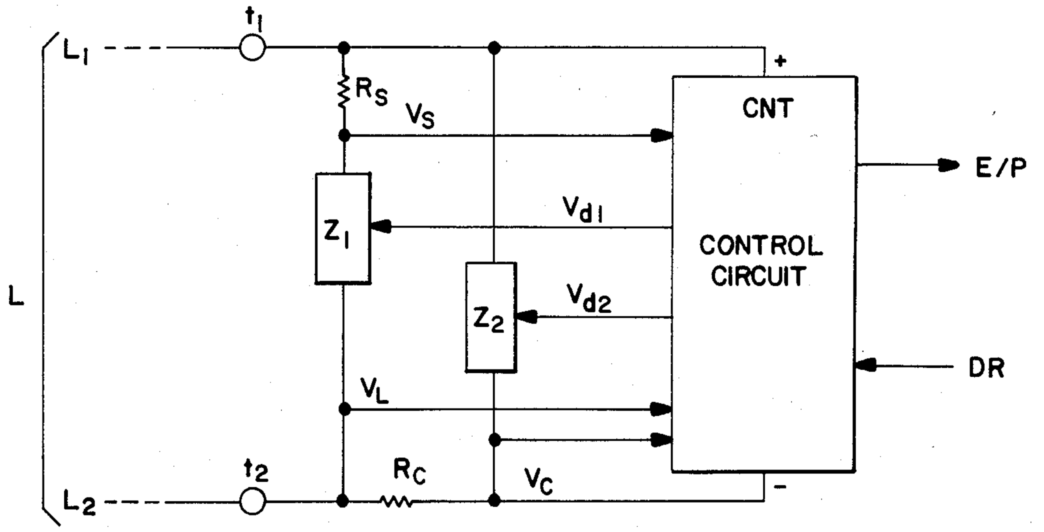

FIGS. 6 and 7 are block diagrams similar to FIG. 3 indicating alternative embodiments. In FIG. 6, a resistor $R_C$ is connected to line terminal $t_2$, while in FIG. 7, a resistor $R_s$ is connected to line terminal $t_1$. Other components are similar to those of FIG. 1.

The control circuit CNT is required to select the detection reference voltage of respective voltages in accordance with the locations of the resistors $R_s$ and $R_C$ and, therefore, it is enough to little modify the arrangement of FIG. 4 depending on such selection.

Accordingly, the object of this invention can be attained only by a single control circuit CNT and since the circuit CNT is totally formed by the digital circuits, the control condition is stabilized and a reduction in size can be realized easily.

Resistor $R_s$ can be replaced with an impedance element such as a diode or a circuit which directly detects a current value and resistor $R_C$ can be replaced with a constant voltage diode.

As a line current, a bias component is determined in accordance with the required power supply current of a load circuit and a motor can be used as a load circuit.

The present invention allows such various modifications that, when a temperature sensor or a vibration sensor which detects a leakage sound of fluid is provided, such detected output is applied to the communication apparatus CE and it can be transmitted as the monitored information.

The embodiments of the invention in which an exclusive property or right is claimed are defined as follows:

1. A receiving apparatus for receiving both power and a control signal over the same transmission line, the transmission line having first and second wires, said apparatus comprising:

a first terminal for connection to said first wire;

a second terminal for connection to said second wire;
a first variable impedance element;
a receiving impedance element;
first connecting means for connecting said first variable impedance element and said receiving impedance element in series and to said first and second terminals;
a second variable impedance element;
a series impedance element;
second connecting means for connecting said second variable impedance element and said series impedance element in series and to said first and second terminals; and,
control circuit means connected to said first variable impedance element for controlling said first variable impedance element to stabilize a transmission line voltage across said first and second terminals to a constant value and connected to said second variable impedance element for controlling said second variable impedance element to stabilize a current flowing through said series impedance element to a constant value.

2. The apparatus of claim 1 wherein said control circuit means comprises a first differential amplifier having an output connected to said first variable impedance means and having first and second inputs, and a second differential amplifier having an output to said second variable impedance element and having first and second inputs.

3. The apparatus of claim 2 wherein said control circuit means comprises a first voltage divider having first and second resistors connected in series, means connecting said first voltage divider to said first and second terminals, said first input of said first differential amplifier being connected to a junction of said first and second resistors.

4. The apparatus of claim 3 wherein said control circuit means comprises a second voltage divider having third and fourth series connected resistors, means connecting said second voltage divider to a junction between said second variable impedance element and said series impedance element and to one of said first and second terminals, said first input of said second differential amplifier being connected to a junction between said third and fourth resistors of said second voltage divider.

5. The apparatus of claim 4 wherein said control circuit means comprises reference source means connected to said junction between said second variable impedance element and said series impedance element and to one of said terminals and having a first reference output connected to said second input terminal of said first differential amplifier and having a second reference output connected to said second input of said second differential amplifier.

6. The apparatus of claim 5 further comprising output means connected to said receiving impedance element for providing an indication of a signal received by said receiving apparatus over said transmission line.

7. The apparatus of claim 1 wherein said control circuit means comprises processor means for determining an amount by which said first and second variable impedance elements must be adjusted to maintain the voltage across said transmission line at a constant value and to maintain the current flowing through the series impedance element at a constant value.

8. The apparatus of claim 7 wherein said processor means comprises processor connecting means connected to receive a signal indicative of the voltage across said transmission line, to receive a signal indicative of a current flowing through said series impedance element, and to receive a signal indicative of the current flowing through said receiving impedance element.

9. The apparatus of claim 8 wherein said processor connecting means comprises a multiplexer.

10. The apparatus of claim 9 wherein said processor means comprises memory means for storing information used in determining a desired impedance value for said first and second variable impedance elements.

11. A receiving apparatus for receiving an electrical signal over a two wire transmission line, said electrical signal comprising a signal component and a bias component, said bias component being used by said receiving apparatus for providing power to the receiving apparatus, said receiving apparatus comprising:
a first variable impedance element and a receiving impedance element connected in series for connection across said transmission line;
a second variable impedance element and a series impedance element connected in series for connection across said transmission line; and,
control circuit means connected to said first variable impedance element for controlling the impedance of said first variable impedance element to stabilize the voltage across said transmission line to a constant value and connected to said second variable impedance element for controlling the impedance of said second variable impedance element to stabilize a current flowing through said series impedance element to a constant value,
whereby a current flowing through said receiving impedance element relates to said signal component and wherein said current flowing through said series impedance element relates to said bias component.

12. The apparatus of claim 11 wherein said control circuit means comprises a first differential amplifier having an output connected to said first variable impedance means and having first and second inputs, and a second differential amplifier having an output to said second variable impedance element and having first and second inputs.

13. The apparatus of claim 12 wherein said control circuit means comprises a first voltage divider having first and second resistors connected in series, means connecting said first voltage divider to said first and second terminals, said first input of said first differential amplifier being connected to a junction of said first and second resistors.

14. The apparatus of claim 13 wherein said control circuit means comprises a second voltage divider having third and fourth series connected resistors, means connecting said second voltage divider to a junction between said second variable impedance element and said series impedance element and to one of said first and second terminals, said first input of said second differential amplifier being connected to a junction between said third and fourth resistors of said second voltage divider.

15. The apparatus of claim 14 wherein said control circuit means comprises reference source means connected to said junction between said second variable impedance element and said series impedance element and to one of said terminals and having a first reference output connected to said second input terminal of said first differential amplifier and having a second reference output connected to said second input of said second differential amplifier.

16. The apparatus of claim 15 further comprising output means connected to said receiving impedance element for providing an indication of a signal received by said receiving apparatus over said transmission line.

17. The apparatus of claim 11 wherein said control circuit means comprises processor means for determining an amount by which said first and second variable impedance elements must be adjusted to maintain the voltage across said transmission line at a constant value and to maintain the current flowing through the series impedance element at a constant value.

18. The apparatus of claim 17 wherein said processor means comprises processor connecting means connected to receive a signal indicative of the voltage across said transmission line, to receive a signal indicative of a current flowing through said series impedance element, and to receive a signal indicative of the current flowing through said receiving impedance element.

19. The apparatus of claim 18 wherein said processor connecting means comprises a multiplexer.

20. The apparatus of claim 19 wherein said processor means comprises memory means for storing information used in determining a desired impedance value for said first and second variable impedance elements.

* * * * *